Figure 3:
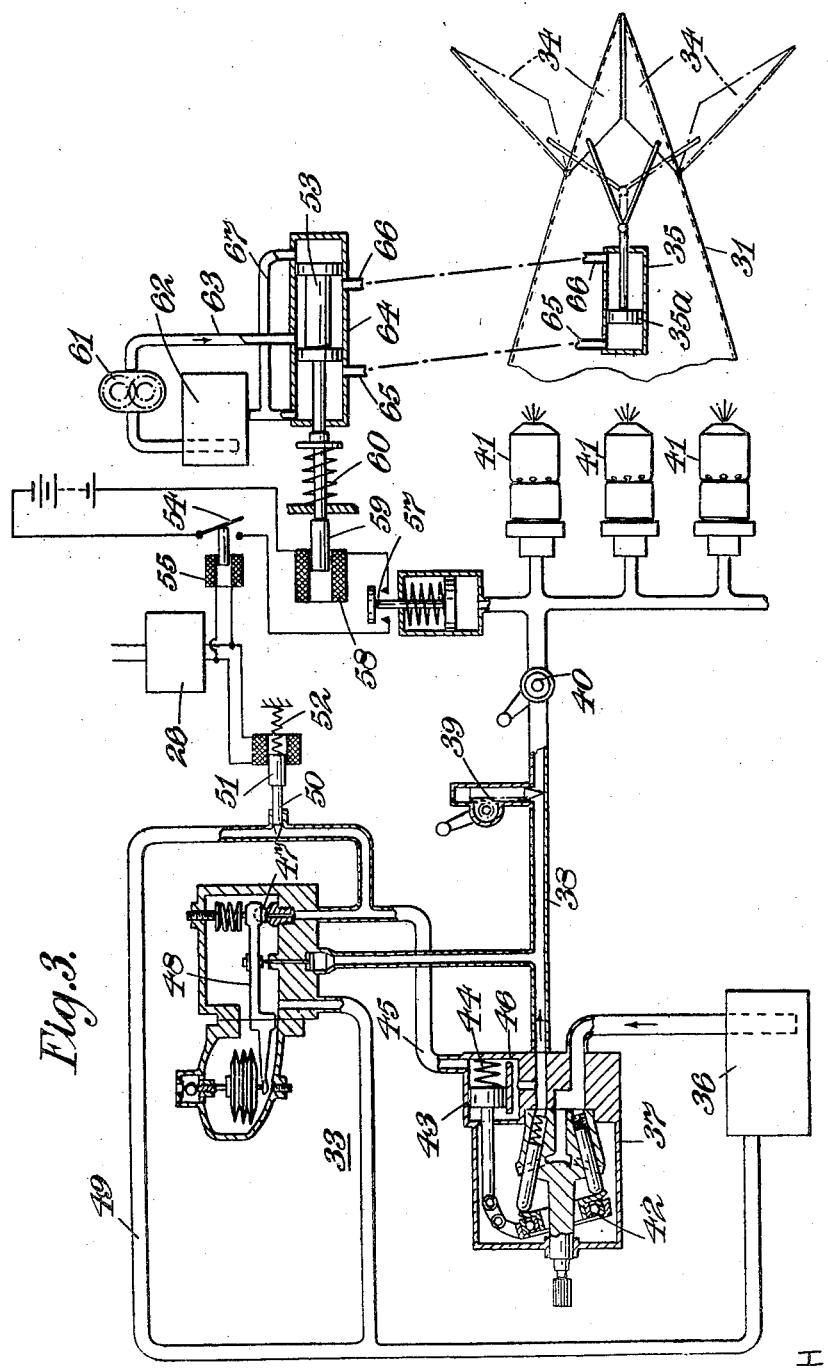

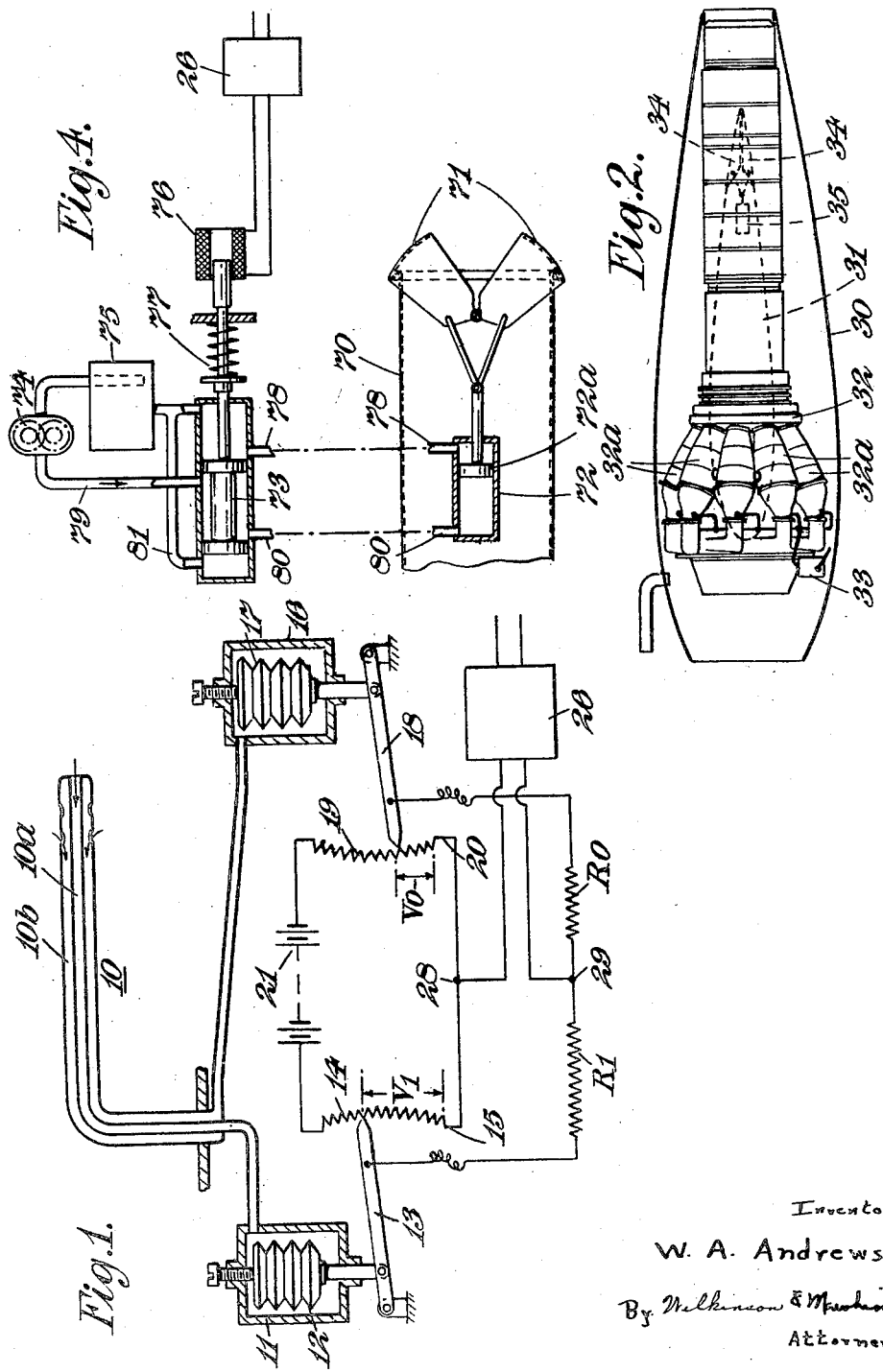
March 9, 1954 — W. A. ANDREWS — 2,671,620
CONTROL MEANS FOR AIRCRAFT AND AIRCRAFT POWER PLANT INSTALLATIONS
Original Filed June 14, 1948 — 2 Sheets-Sheet 1
Inventor
W. A. Andrews
By Wilkinson & McKinney
Attorneys March 9, 1954   W. A. ANDREWS   2,671,620
CONTROL MEANS FOR AIRCRAFT AND AIRCRAFT
POWER PLANT INSTALLATIONS
Original Filed June 14, 1948   2 Sheets-Sheet 2

Inventor
W. A. Andrews
By Wilkinson & Mawhinney
Attorneys

Patented Mar. 9, 1954

2,671,620

UNITED STATES PATENT OFFICE 2,671,620

CONTROL MEANS FOR AIRCRAFT AND AIRCRAFT POWER PLANT INSTALLATIONS

Walter Agnew Andrews, Littleover, Derby, England, assignor to Rolls-Royce Limited, Derby, England, a British company Original application June 14, 1948, Serial No. 32,868. Divided and this application September 19, 1952, Serial No. 310,387

Claims priority, application Great Britain June 18, 1947

4 Claims. (Cl. 244—53)

This application is a divisional from my United States patent application Serial No. 32,868, filed June 14th, 1948, which has matured into U. S. Patent No. 2,629,569, granted February 24, 1953.

This invention relates to control means for aircraft and aircraft power-plant installations. When designing aircraft for flight at high speeds, it is desirable to provide means for limiting the propulsive thrust of the power-plant to avoid excessive speed of the aircraft under certain flying conditions. For example, an aircraft having a gas-turbine power-plant may be designed to have a high rate of climb, and the maximum power developed by the power-plant may therefore be such that, in level flight, excessive speeds could be obtained giving rise to the possibility of structural failure.

An aircraft structure design may be based on considerations of a maximum permissible actual speed, the limitation being represented by a factor known as the Mach number which represents the ratio of the actual speed of the aircraft to the speed of sound in the atmosphere in which the aircraft is flying. It may be desirable therefore to provide a control which limits the propulsive thrust developed by the power-plant of the aircraft to avoid exceeding the design Mach number.

If the atmospheric pressure is represented by $P_0$, and the total head, i. e. the Pitot pressure plus the static pressure, is represented by $P_1$, then the value of the Mach number M is given by the equation $$M = f\frac{(P_1)}{(P_0)}$$

The present invention consists in converting the values of $P_0$ and $P_1$ into electrical equivalents, which are compared in an electrical circuit, such that when their ratio exceeds a value corresponding to a chosen value of M, an electrical servo device is operated to actuate means to reduce the propulsive thrust of the power-plant.

In certain cases, it may be desirable to arrange that the servo means, or an independent servo relay, also operates the aircraft control surfaces, e. g. the elevators or dive brakes, in order to reduce the aircraft speed. Such additional controlling means may operate in sequence with the control of the power-plant when the engine power has been reduced to a selected minimum. In this manner it is possible to ensure reduction of aircraft speed below a critical value even where reduction of power has not been wholly effective to this end.

According to one arrangement of the invention, there is provided for use in a power driven aircraft having means effective to reduce the propulsive thrust developed by the aircraft power-plant, control means for actuating the means to reduce the propulsive thrust comprising a first pressure-responsive device arranged to be subjected to ambient atmospheric pressure; a second pressure-responsive device arranged to be subjected to the total head pressure arising from flight of the aircraft; an electrical circuit comprising a first resistance, a second resistance, a source of potential in series; a second electrical circuit comprising a third resistance, means interconnecting said first and third resistances, electrical means, and first and second connecting means interconnecting said electrical means with said second and third resistances and with said first and second resistances respectively; first displaceable means connected to said second pressure-responsive device and arranged to vary the point of connection between said first and third resistances; a second displaceable means connected with said first pressure-responsive device and arranged to vary the point of connection between said second resistance and said first connecting means; said electrical means being connected to actuate the means to reduce the propulsive thrust from the aircraft power-plant, whereby the propulsive thrust of the aircraft power plant is controlled by variation in the ambient pressure and the total head pressure.

The invention is especially useful in multi-engined aircraft, where it is desirable that the propulsive thrust of all engines should be reduced simultaneously and similarly to avoid yawing of the aircraft. In such an application a single controlling system may be adopted, avoiding providing separate control equipment to be associated with the separate control systems for each engine.

There will now be described by way of example of this invention, an arrangement for controlling the speed of an aircraft in accordance with a predetermined value of the factor M above referred to.

The following description has reference to the accompanying diagrammatic drawings in which Figure 1 illustrates apparatus for obtaining an electrical control in accordance with a preselected value of M, Figure 2 illustrates an aircraft wing with a gas-turbine power unit mounted in it, Figure 3 illustrates a suitable fuel system and other controls for the aircraft to enable the net thrust on the aircraft to be reduced when a preselected value of M is exceeded.

Figure 4 illustrates a modification of thrust reducing means.

Referring to Figure 1, there is shown a Pitot head 10, which will be mounted on the aircraft so that the pressure within the tube 10a is dependent on the aircraft speed and the pressure in the tube 10b will be the static atmospheric pressure.

The tube 10a communicates with a chamber 11 in which is mounted an evacuated expansible capsule 12 so that the capsule will expand and contract in accordance with variations of the total head (Pitot pressure + static pressure), and the capsule is arranged to rock a pivoted lever 13 forming a movable contact working over a potentiometer resistance 14 so that the voltage $V_1$ tapped off between the lever contact and the point 15 is a function of total head $P_1$.

The tube 10b likewise communicates with a chamber 16 containing an evacuated, expansible capsule 17 controlling a rocking lever 18 forming a movable contact working over a potentiometer resistance 19. The voltage $V_0$ tapped off between the contact lever 18 and the point 20 will therefore be a function of the atmospheric static pressure $P_0$.

The resistances 14 and 19 are connected in series with one another and with a voltage source 21 so that these three elements form a closed circuit and the tapped off portions of the resistances 14 and 19 are arranged to form two adjacent arms of a bridge circuit and these arms have a common point 28. The bridge circuit also comprises a pair of resistances $R_1$, $R_0$ connected together at a common point 29 and connected at their opposite ends to the lever 13 and the lever 18 respectively.

The points of contact of the levers 13 and 18 with the resistances 14 and 19 respectively form the input connections of the bridge circuit.

The common points 28 and 29 are connected by leads to the input terminals of an amplifier 26.

It can be shown that when the bridge circuit is balanced and the voltage drop (V) between the points 28 and 29 is zero then $$\frac{R_1}{R_0} = \frac{V_1}{V_0}$$

Now, since $V_1$, $V_0$ are functions of the pressures $P_1$, $P_0$ respectively, by appropriate selection of the functions converting $P_0$, $P_1$ into voltages $V_0$, $V_1$, the value of M for which balance is obtained, is determined by the ratio $$\frac{R_1}{R_0}$$

The bridge circuit is arranged so that if the chosen value of M is exceeded by the aircraft, the out-of-balance voltage energises the amplifier to produce a power output which can be employed to effect a control on the aircraft to reduce its speed until the chosen value of M is reached. When the value of M is below the chosen value there is no output from the amplifier 26.

Referring now to Figures 2 and 3, there is illustrated one manner in which the output from the amplifier 26 can be employed to effect a reduction of the net thrust on an aircraft.

The aircraft has as a power unit a jet-propulsion gas-turbine engine 32 mounted in a nacelle 30 in its wing 31. The gas-turbine engine 32 is of known construction comprising a series of combustion chambers 32a supplied with fuel through a suitable control mechanism indicated at 33. The wing 31 is provided with drag flaps 34 controlled by a hydraulic jack 35 by means of which flaps the drag of the aircraft can be increased and thus its speed decreased.

The fuel system 33 is illustrated in more detail in Figure 3, and comprises a reservoir 36 from which fuel is drawn by a multi-plunger, variable-stroke pump 37 by which the fuel is delivered through a pipe-line 38 past a manually operated throttle 39 and a high-pressure shut-off cock 40 to the fuel-injection devices 41 of which there is normally one to each combustion chamber 32a.

The stroke of the pump 37 is controlled hydraulically in the well-known manner by a swash-plate 42 the angle of inclination of which is set by a piston member 43 loaded on one side by a spring 44 and a fluid pressure dependent on the fuel delivery pressure, and on the other side by the full delivery pressure. The fluid passing to the spring-loaded side of the piston passes through a restricted orifice 46 and this side of the piston communicates with a pipe-line 45 the flow through which is controlled by a valve 47. The position of the valve is determined by a barometric pressure control unit 48 of well-known construction. The barometric pressure control unit operates to maintain the fuel delivery pressure constant at a pressure determined in accordance with the atmospheric pressure, and in accordance with the engine speed.

In order to reduce the net thrust on the aircraft when the selected value of M is exceeded, the following arrangement is adopted. A by-pass 49 is taken from the pipe-line 45 to the suction side of the pump 37 and a valve 50 is provided in the by-pass to control the flow therethrough. During normal operation of the aircraft the valve 50 is closed, but should the selected value of M be exceeded the valve is opened so that the pressure differential across piston 43 will be increased and the pump stroke and the fuel delivery to the fuel injection devices 41 decreased.

The valve 50 is controlled by a solenoid device 51 which is energised by the output from the amplifier 26. A spring 52 is provided to oppose the opening of valve 50 so that the amount by which the valve opens, is dependent on the output of the amplifier and thus the voltage input to the amplifier 26.

In this arrangement, moreover, the control circuit is arranged also to operate the drag flaps 34, if the aircraft speed exceeds the preselected value of M when the fuel delivery pressure has been reduced to a selected minimum value.

For this purpose, the hydraulic jack 35 for opening and closing the drag flaps 34 is fed with pressure fluid under control of a piston valve 53 which is controlled electrically from the amplifier 26. The electrical control circuit includes a switch 54 operated by a solenoid 55 which is energised when the amplifier 26 is operative, and a pressure-operated switch 56 which is closed when the fuel delivery pressure in pipe-line 38 between the cock 40 and injection devices 41 falls below a selected value.

When the switches 56, 54 are closed, i. e. when the aircraft exceeds the preselected value of M and the fuel pressure has been reduced to a selected value, a solenoid 58 is energised drawing its armature 59 to the left against spring 60 and thereby moving piston-valve 53 to put the left-hand end of the jack 35 into communication with the pressure fluid from a hydraulic pump 61. The ram 35a of the jack 35 thus moves to the right and raises the drag flaps 34.

The hydraulic pump 61 draws the liquid from a reservoir 62 and delivers it through pipe-line 63 to the piston-valve cylinder 64 whence it is delivered through pipe-line 65 or 66 to one end or the other of the hydraulic jack according to whether the solenoid 58 is energised or de-energised. The return fluid flow is conveyed from the piston-valve cylinder 64 to the reservoir 62 through pipe-lines 67.

Referring now to Figure 4, there is illustrated an alternative method of reducing the net propulsive thrust on the aircraft. In this arrangement, the jet-pipe nozzle is arranged to be adjustable between a small area setting, and a greater area setting in the latter of which settings the thrust obtained from the exhaust gases flowing through the nozzle will be reduced as compared with the small area setting even though the fuel supply to the engine is unaltered.

The jet-pipe 70 carries at its nozzle end a pair of flap members 71 which are in the form of half zones of a sphere and are pivoted on the jet pipe to rock about a diameter of the sphere.

The flaps are controlled as to their position by means of a hydraulic jack 72 such that when the ram 72a of the jack is at the right-hand end of the cylinder, the flaps occupy a position in which the nozzle area is small and when the ram 72a is at the left-hand end of the cylinder the flaps are retracted to increase the nozzle area.

Pressure fluid is delivered to the jack 72 under control of a piston valve 73 from a pump 74 drawing liquid from a reservoir 75.

The position of the piston valve 73 is determined by a solenoid 76 which is energised when the amplifier 26 gives a power output that is when the preselected value of M is exceeded by the aircraft.

When the solenoid 76 is energised the piston-valve moves to the right against spring 77 placing the pipe-line 78 in communication with the pressure fluid line 79 and pipe-line 80 in communication with the return line 81. When the solenoid is de-energised the spring 77 holds the piston-valve 73 to the left so that pressure liquid is delivered to pipe-line 80 and pipe-line 78 is connected to the return line 81.

This latter arrangement may, if desired, be employed in addition to the fuel-control above described.

I claim:

1. For use in a power-driven aircraft having means effective to reduce the propulsive thrust developed by the aircraft power plant, control means for actuating the means to reduce the propulsive thrust comprising a first pressure-responsive device arranged to be subjected to ambient atmospheric pressure; a second pressure-responsive device arranged to be subjected to the total head pressure arising from flight of the aircraft; an electrical circuit comprising a first resistance, a second resistance, a source of potential in series; a second electrical circuit comprising a third resistance, means interconnecting said first and third resistances, electrical means, and first and second connecting means interconnecting said electrical means with said second and third resistances and with said first and second resistances respectively; first displaceable means connected to said second pressure-responsive device and arranged to vary the point of connection between said first and third resistances; a second displaceable means connected with said first pressure-responsive device and arranged to vary the point of connection between said second resistance and said first connecting means; said electrical means being connected to actuate the means to reduce the propulsive thrust from the aircraft power plant, whereby the propulsive thrust of the aircraft power plant is controlled by variation in the ambient pressure and the total head pressure.

2. For use in a power-driven aircraft having means effective to reduce the propulsive thrust developed by the aircraft power plant, control means for actuating the means to reduce the propulsive thrust comprising a first pressure-responsive device arranged to be subjected to ambient atmospheric pressure; a second pressure-responsive device arranged to be subjected to the total head pressure arising from flight of the aircraft; an electrical bridge circuit comprising a first variable electrical resistance, a second variable resistance, a first fixed resistance and a second fixed resistance, said resistances being connected end to end in a closed circuit, a source of potential connected between the point of connection of two of said resistances and the point of connection of the other two of said resistances; a pair of output connections connected across the two remaining points of connection of said four resistances; a first displaceable means connected to said second pressure-responsive device and connected to said first variable resistance to vary the circuit value thereof; a second displaceable means connected to said first pressure responsive device and connected to said second variable resistance to vary the circuit value thereof; and electrical means connected to said output means to actuate the means to reduce the propulsive thrust from the aircraft power plant, whereby the propulsive thrust of the aircraft power plant is controlled by variation in the ambient pressure and the total head pressure.

3. For use in a power-driven aircraft having means effective to reduce the propulsive thrust developed by the aircraft power plant, control means for actuating the means to reduce the propulsive thrust comprising a first pressure-responsive device arranged to be subjected to ambient atmospheric pressure; a second pressure-responsive device arranged to be subjected to the total head pressure arising from flight of the aircraft; an electrical bridge circuit comprising a first variable circuit element, a second variable circuit element, a first fixed circuit element and a second fixed circuit element, said circuit elements being connected end to end in a closed circuit, a source of potential connected between the point of connection of two of said circuit elements and the point of connection of the other two of said circuit elements; a pair of output connections connected across the two remaining points of connection of said four circuit elements; a first displaceable means connected to said first pressure-responsive device and connected to said first variable circuit element to vary the value thereof; a second displaceable means connected to said second pressure-responsive device and connected to said second variable circuit element to vary the value thereof; and electrical means connected to said pair of output connections to actuate the means to reduce the propulsive thrust from the aircraft power plant, whereby the propulsive thrust of the aircraft power plant is controlled by variation in the ambient pressure and the total head pressure.

4. For use in a power-driven aircraft having means effective to reduce the propulsive thrust developed by the aircraft power plant, control means for actuating the means to reduce the propulsive thrust comprising a first pressure-responsive device arranged to be subjected to ambient atmospheric pressure; a second pressure-responsive device arranged to be subjected to the total head pressure arising from flight of the aircraft; an electrical bridge circuit of the kind which has as a condition of balance of the bridge circuit that the ratio of the impedances in a pair of arms thereof has a selected value, said bridge circuit having a first circuit element in one of said pair of arms connected to have its impedance varied by said first pressure-responsive device and a second circuit element in the other of said pair of arms connected to have its impedance varied by said second pressure-responsive device; a source of potential; input connections from said source of potential to the bridge circuit; output connections from said bridge circuit; and electrical means connected to said output connections to actuate the means to reduce the propulsive thrust of the aircraft power plant, whereby the propulsive thrust of the power plant is controlled by variation in the ambient pressure and the total head pressure.

WALTER AGNEW ANDREWS.

References Cited in the file of this patent

UNITED STATES PATENTS

| Number | Name | Date |
|---|---|---|
| 1,418,131 | Curtiss | May 30, 1922 |